(12) United States Patent
Yamamoto (10) Patent No.: US 9,349,533 B2
(45) Date of Patent: May 24, 2016

(54) SECONDARY-SIDE POWER RECEIVING CIRCUIT FOR CONTACTLESS POWER FEED EQUIPMENT

(75) Inventor: Masaaki Yamamoto, Osaka (JP)

(73) Assignee: Daifuku Co., Ltd. (JP)

( * ) Notice: Subject to any disclaimer, the term of this patent is extended or adjusted under 35 U.S.C. 154(b) by 482 days.

(21) Appl. No.: 14/002,396

(22) PCT Filed: Mar. 8, 2012

(86) PCT No.: PCT/JP2012/055899
§ 371 (c)(1),
(2), (4) Date: Aug. 30, 2013

(87) PCT Pub. No.: WO2012/124581
PCT Pub. Date: Sep. 20, 2012

(65) Prior Publication Data
US 2013/0334895 A1    Dec. 19, 2013

(30) Foreign Application Priority Data

Mar. 16, 2011    (JP) .................................. 2011-057325

(51) Int. Cl.
*H01F 27/42* (2006.01)
*H01F 37/00* (2006.01)
(Continued)

(52) U.S. Cl.
CPC ................ *H01F 38/14* (2013.01); *H02J 5/005* (2013.01); *H02M 7/217* (2013.01)

(58) Field of Classification Search
CPC ........... H01F 38/14; H02J 5/005; H02J 7/025; H02M 7/217; H02M 3/155; B61L 23/14; B60L 5/00

USPC .......................................... 307/104; 320/108
See application file for complete search history.

(56) References Cited

U.S. PATENT DOCUMENTS

| | | | |
|---|---|---|---|
| 5,917,712 A * | 6/1999 | Okura | H02M 1/34 363/19 |
| 6,335,853 B1 | 1/2002 | Kitagawa et al. | 361/103 |

(Continued)

FOREIGN PATENT DOCUMENTS

| | | | |
|---|---|---|---|
| CN | 1167561 C | 9/2004 | B01L 5/00 |
| CN | 1625017 A | 6/2005 | H02J 17/00 |

(Continued)

OTHER PUBLICATIONS

International Search Report for International Application No. PCT/JP2012/055899, Jun. 12, 2012.

(Continued)

*Primary Examiner* — Rexford Barnie
*Assistant Examiner* — Rasem Mourad
(74) *Attorney, Agent, or Firm* — Kusner & Jaffe (57) ABSTRACT

A PWM module is provided to output a driving pulse to a switching device in synchronization with a synchronizing pulse having a frequency twice the frequency of the high-frequency current of a primary-side induction line. The PWM module performs output voltage feedback control such that the output voltage of an output capacitor is set at a reference voltage. The module outputs, to the switching device, the driving pulse having a half width of the pulse width of a driving pulse that can be outputted, at the start of power supply to the primary-side induction line. Moreover, the module forcibly performs the output voltage feedback control if an output voltage of the output capacitor does not increase to the reference voltage within a reference time.

4 Claims, 7 Drawing Sheets

(51) Int. Cl.
*H01F 38/00* (2006.01)
*H01F 38/14* (2006.01)
*H02J 5/00* (2016.01)
*H02M 7/217* (2006.01)

(56) References Cited

U.S. PATENT DOCUMENTS

| | | | | |
|---|---|---|---|---|
| 7,009,860 | B2* | 3/2006 | Kazutoshi | H02J 5/005 307/10.1 |
| 7,109,602 | B2 | 9/2006 | Nishino | 307/17 |
| 7,119,311 | B2* | 10/2006 | Makoto | H02J 5/005 219/661 |
| 7,710,751 | B2 | 5/2010 | Nishino | 363/67 |
| 2005/0135129 | A1 | 6/2005 | Kazutoshi | 363/98 |
| 2007/0145830 | A1* | 6/2007 | Lee | H02J 5/005 307/135 |
| 2011/0084656 | A1* | 4/2011 | Gao | H02J 7/025 320/108 |
| 2012/0155136 | A1* | 6/2012 | Von Novak | H02J 5/005 363/126 |

FOREIGN PATENT DOCUMENTS

| | | | | |
|---|---|---|---|---|
| CN | 1625018 A | 6/2005 | | H02J 17/00 |
| JP | 11-178104 | 7/1999 | | B60L 5/00 |
| JP | 2001-025241 | 1/2001 | | H02M 3/155 |
| JP | 2006-205884 | 8/2006 | | B61L 23/14 |
| JP | 2010-154696 | 7/2010 | | B60L 5/00 |
| TW | I232625 | 5/2005 | | B60L 5/00 |
| TW | 200644375 | 12/2006 | | H02J 4/00 |

OTHER PUBLICATIONS

Office Action issued in connection with Chinese Patent Application No. 201280004564.1 dated Mar. 26, 2015.

Office Action issued in connection with Taiwan Patent Application No. 101108217 dated Jun. 23, 2015.

\* cited by examiner

SECONDARY-SIDE POWER RECEIVING CIRCUIT FOR CONTACTLESS POWER FEED EQUIPMENT

FIELD OF INVENTION

The present invention relates to a secondary-side power receiving circuit for contactless power feed equipment.

BACKGROUND OF THE INVENTION

One example of a known secondary-side power receiving circuit for contactless power feed equipment is disclosed in Japanese Patent Laid-Open No. 11-178104.

In the known secondary-side power receiving circuit for contactless power feed equipment, a pickup coil is opposed to a primary-side induction line that receives a high-frequency current at a frequency of, e.g., 10 kHz, the pickup coil receiving an induced electromotive force from the primary-side induction line. A resonant capacitor is connected in parallel with the pickup coil so as to form a resonant circuit resonating with the pickup coil at the frequency of the primary-side induction line. The resonant circuit is connected to a rectifying circuit (full-wave rectifying circuit) to feed power through a constant voltage control circuit to a load having varying power consumption (e.g., an inverter for controlling the traveling motor of a motor vehicle).

The constant voltage control circuit includes a choke coil, a diode, an output capacitor (voltage capacitor), a switching device (e.g., a transistor for power adjustment) that switches between a closed condition and an opened condition across the output ends of the rectifying circuit, and a control circuit that controls the switching device.

Under the control of the control circuit, an output voltage (the voltage of the load) is measured, the load is reduced by stopping the traveling motor, the output voltage (a voltage across the output capacitor) increases, and then the output voltage exceeds a preset reference voltage. At this point, the switching device is closed to stop power supply from the rectifying circuit to the load and interrupt charging of the output capacitor. Power is then supplied to the load from the output capacitor, and thus the output voltage is reduced to be less than the reference voltage. This opens the switching device to supply power from the rectifying circuit to the load and charge the output capacitor to reset the output voltage to the reference voltage.

The action of the configuration of the secondary-side power receiving circuit will be described below.

When a high-frequency current having a frequency of, e.g., 10 kHz is supplied to the primary-side induction line, magnetic fluxes generated on the primary-side induction line causes an induced electromotive force on the pickup coil, and then a current generated on the pickup coil by the induced electromotive force is rectified by the rectifying circuit. When the switching device is opened, the current is supplied to the load through the constant voltage control circuit. When the load decreases and the output voltage exceeds the preset reference voltage, the switching device is placed in a closed condition so as to supply power from the output capacitor to the load, thereby reducing the output voltage. When the output voltage is lower than the preset reference voltage, the switching device is placed in an opened condition to reset the output voltage to the reference voltage.

Unfortunately, the known contactless power feed equipment causes the following problems:

In the known secondary-side power receiving circuit for contactless power feed equipment, the output voltage is set at 0 V or close to 0 V in an initial condition for starting power supply to the primary-side induction line by switching control for monitoring the output voltage to be set at the reference voltage. Thus, the switch is continuously opened so as to require a 100% load (full-load condition).

Hence, a large number of devices or apparatuses in the full-load condition may be overloaded so as to exceed the rated power of a power supply device, activating the protective function of the power supply device to interrupt power supply to the induction line. This may prevent power supply to the devices or apparatuses. To avoid this problem, unfortunately, the number of devices or apparatuses to be operated needs to be considerably reduced at the start of power supply.

SUMMARY OF INVENTION

Technical Problem

The present invention has been devised to solve these problems. An object of the present invention is to provide a secondary-side power receiving circuit for contactless power feed equipment that can feed power from the primary side to a large number of devices or apparatuses to be operated.

Solution To Problem

In order to attain the object, a secondary-side power receiving circuit for contactless power feed equipment according to the present invention, the secondary-side power receiving circuit being provided in each of devices or apparatuses so as to receive power in a contactless manner from a primary-side induction line that receives a high-frequency current from a power supply device, the secondary-side power receiving circuit including: a pickup coil opposed to the primary-side induction line, the pickup coil receiving an induced electromotive force from the primary-side induction line; a resonant capacitor connected in parallel with the pickup coil, the resonant capacitor forming a resonant circuit that resonates at the frequency of the high-frequency current with the pickup coil; a full-wave rectifying circuit connected in parallel with the resonant capacitor of the resonant circuit; a switch and an output capacitor connected in parallel between the output terminals of the full-wave rectifying circuit, the output capacitor feeding power to a load having varying power consumption; and a controller that switches a closed condition and an opened condition of the switch, the controller including: a pulse generating circuit that outputs a synchronizing pulse having a frequency multiple times higher than the frequency of the high-frequency current in synchronization with a full-wave voltage signal outputted from one of the output terminals of the full-wave rectifying circuit; and a pulse width control circuit that outputs a driving pulse to the switch and performs output voltage feedback control such that the output voltage of the output capacitor is set at a preset reference voltage by closing the switch at the turn-on of the driving pulse or opening the switch at the turn-off of the driving pulse, wherein the pulse width control circuit determines power receivable by each of the devices or apparatuses at the start of power supply to the primary-side induction line by dividing the output rated power of the power supply device by the number of devices or apparatuses, the pulse width control circuit determines the pulse width of the driving pulse capable of suppressing power within the receivable power by the pulse width of a driving pulse that can be outputted, the pulse width control circuit performs switching control at the start of power supply to the primary-side induction line such that the driving pulse capable of suppressing the power is outputted to the switch in synchronization with the synchronizing pulse inputted from the pulse generating circuit, and then the pulse width control circuit performs the output voltage feedback control when the output voltage of the output capacitor reaches the preset reference voltage.

According to the configuration of the present invention, the contactless power feed equipment of the present invention has useful technical operation and effect as follows:

At the start of power supply to the primary-side induction line, a driving pulse capable of suppressing received power with a pulse width m is outputted, the pulse width m being determined by "power receivable by each of the devices or apparatuses" and "a pulse width W of a driving pulse that can be outputted". In other words, the driving pulse is outputted according to duty=m/W.

When the driving pulse has a pulse width of 0 (duty=0), in other words, when the driving pulse is turned off, the switch is continuously opened, and the output capacitor is continuously charged, the secondary side is placed in a full-load condition with respect to the primary side. In the case where the pulse width is m and the driving pulse is turned on, the switch is closed and the output capacitor is not charged. Thus, the secondary side is placed in a load condition of (1−m/W) with respect to the primary side. As the pulse width m decreases, the secondary side comes close to the full-load condition. In the load condition of (1−m/W), the pulse width m is set so as to suppress power to the power receivable by each of the devices or apparatuses. At this point, even if all the devices or apparatuses are simultaneously loaded at the start of power supply, the power supply device for supplying a high-frequency current to the primary-side induction line does not become overloaded, avoiding a power shutdown. Thus, power can be continuously supplied to a large number of devices or apparatuses.

When the output capacitor is charged to the reference voltage, output voltage feedback control is performed. After the output voltage reaches the reference voltage, power may be supplied from the primary-side induction line according to consumed power. Thus, the output voltage feedback control of the devices or apparatuses does not overload the power supply device, preventing a power shutdown.

As has been discussed, at the start of power supply to the primary-side induction line, power received by each of the devices or apparatuses is suppressed to the receivable power of each of the devices or apparatuses. Thus, even if the power supply device for supplying a high-frequency current to the primary-side induction line is loaded when all the devices or apparatuses start receiving power at the start of power supply, the power supply device does not become overloaded, preventing a power shutdown. Hence, power can be continuously supplied to a large number of devices or apparatuses.

DETAILED DESCRIPTION OF THE INVENTION

An embodiment of the present invention will be described below with reference to the accompanying drawings.

Figure 1:
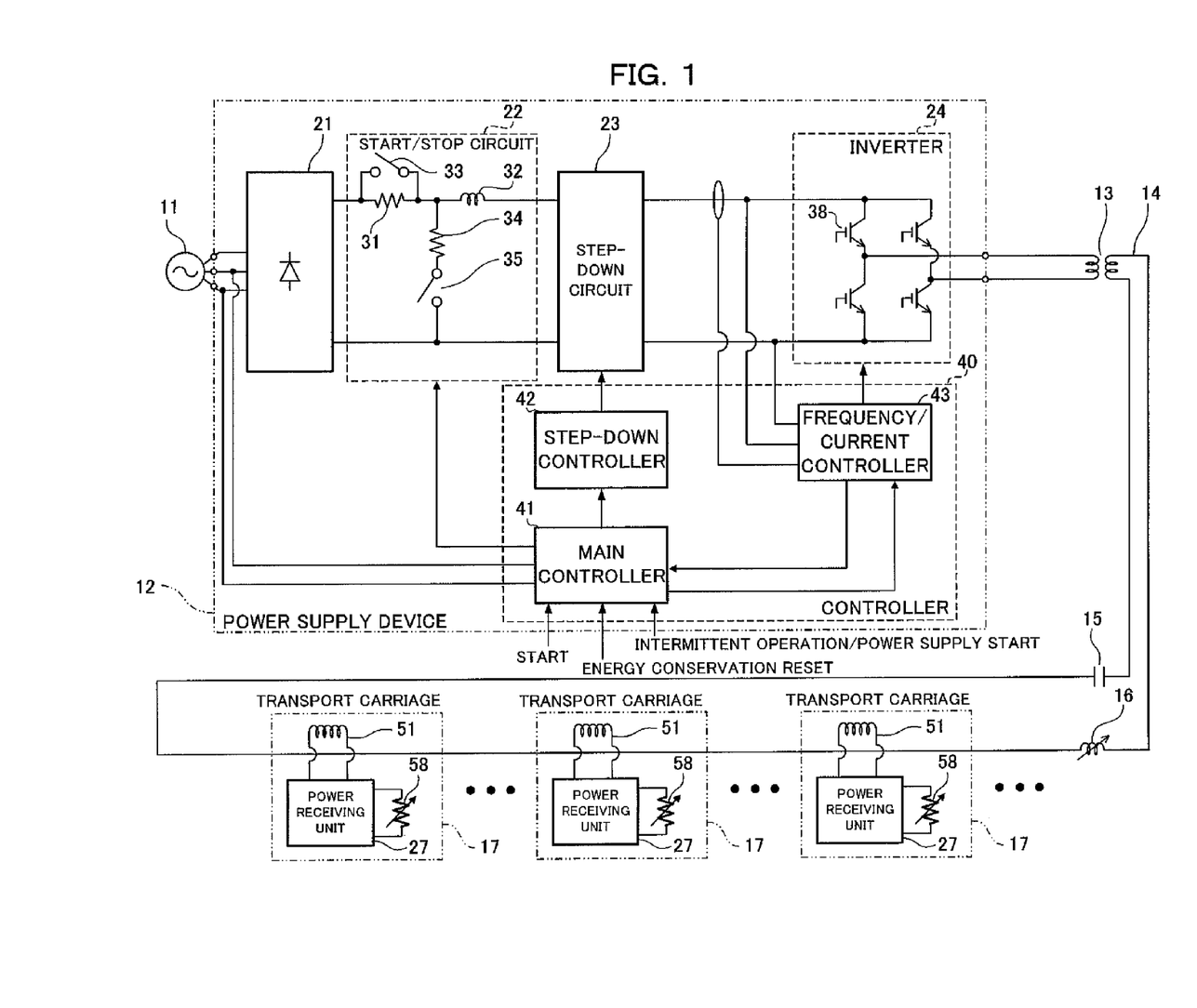
FIG. 1 is a circuit diagram showing contactless power feed equipment according to an embodiment of the present invention.

FIG. 1 is a circuit diagram showing contactless power feed equipment according to the embodiment of the present invention. In the contactless power feed equipment, a high-frequency current is supplied from a power supply device 12 to an induction line 14, and then power is supplied in a contactless manner to a plurality of transport carriages (an example of an apparatus or a device) 17 from the induction line 14 having received the high-frequency current. The induction line 14 is continuously provided (placed) along the traveling rail (an example of a travel path, not shown) of the transport carriages 17. A capacitor 15 is connected in series with the induction line 14. Furthermore, a variable inductor 16 for adjusting the inductance value of the overall induction line 14 is connected in series with the induction line 14. The variable inductor 16 is connected if the induction line 14 does not have a predetermined line length, that is, if the induction line 14 does not have a predetermined inductance value. A high-frequency transformer 13 is disposed between the induction line 14 and the power supply device 12. The high-frequency transformer 13 can amplify an output voltage when the induction line 14 has a long distance (length). For example, the high-frequency transformer 13 is installed to double the output voltage.

Figure 4:
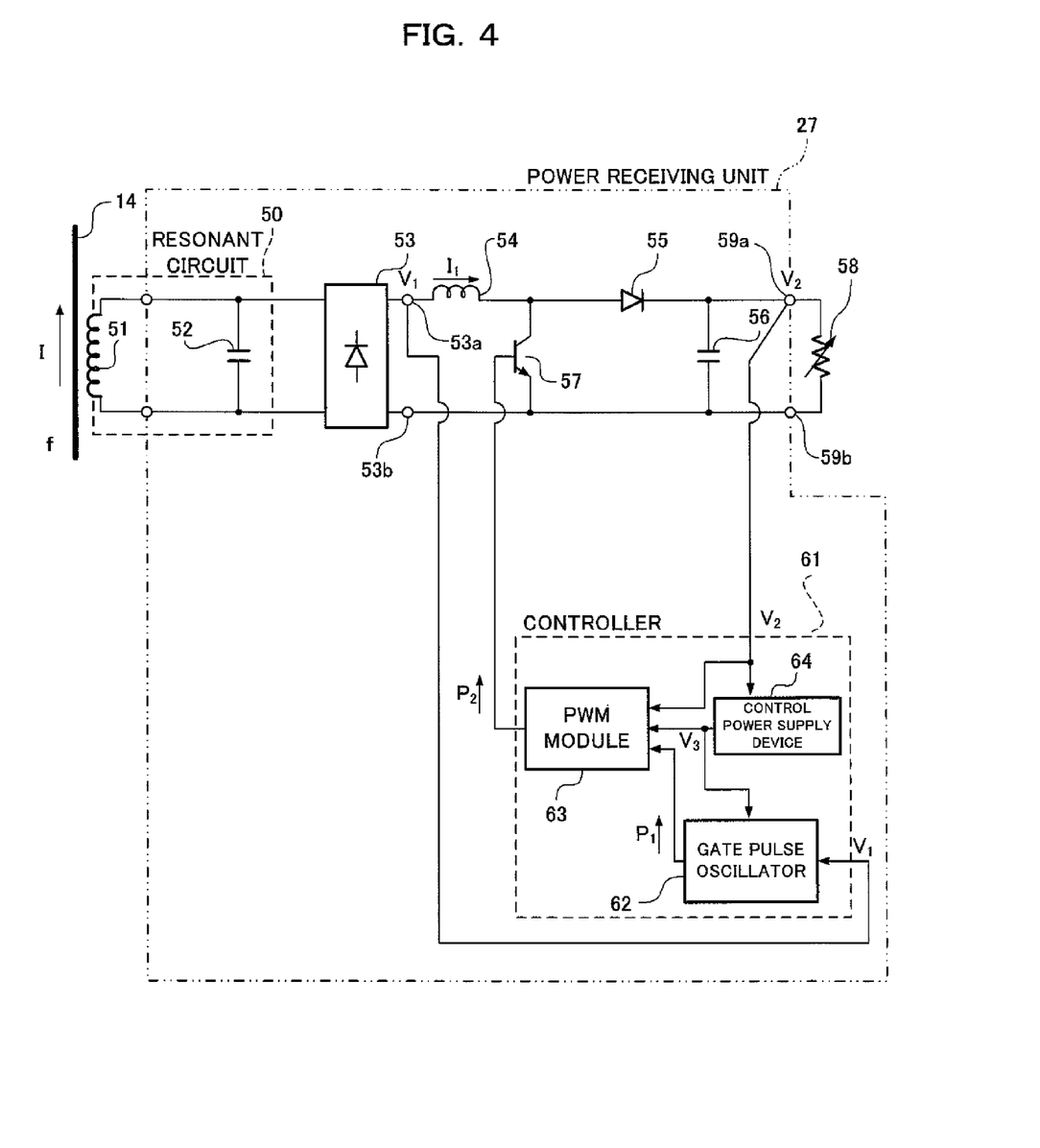
FIG. 4 is a circuit diagram showing a secondary-side power receiving circuit in the contactless power feed equipment.

The transport carriage 17 includes a pickup coil 51 opposed to the induction line 14 so as to receive an electromotive force induced from the induction line 14. The pickup coil 51 is connected to a power receiving unit 27. As shown in FIG. 4, the power receiving unit 27 is connected to a load (e.g., an inverter for controlling the traveling motor of the transport carriage 17) 58 with varying power consumption.

As will be specifically described later, the power receiving unit 27 has the function of constant voltage control for controlling an output voltage to the load 58 to a constant voltage. Thus, as shown in FIG. 4, the terminal end of the power receiving unit 27 includes an output capacitor (voltage capacitor) 56. The voltage of the output capacitor 56 is fed back to control an output voltage to the load 58 at a constant voltage. The pickup coil 51 is connected in parallel with a resonant capacitor 52 that forms a resonant circuit 50 with the pickup coil 51, the resonant circuit 50 resonating at the frequency of the high-frequency current passing through the induction line 14. The resonance frequency of the resonant circuit 50 is set at 9.74 kHz.

Power Supply Device

The power supply device 12 is connected to a commercial power supply 11. The power supply device 12 includes a rectifying circuit 21 that converts an alternating current from the commercial power supply 11 into a direct current, a start/stop circuit 22, a step-down circuit 23, an inverter 24, and a controller 40.

The controller 40 includes a main controller 41, a step-down controller 42, and a frequency/current controller 43, each including a CPU (specifically described later). The power supply device 12 further includes a protective device (not shown) that detects whether a current passing through the induction line 14 is an overcurrent (overload) or not. When the protective device detects an overload, the main controller 41 interrupts a current supplied to the induction line 14 (described later).

Start/Stop Circuit 22

The start/stop circuit 22 includes an inrush resistor 31 and a coil (reactor) 32 that are connected in series between the rectifying circuit 21 and the step-down circuit 23, a starting conductor 33 that short-circuits the inrush resistor 31, and a discharging resistor 34 and a stopping conductor 35 that are connected in series between the node of the inrush resistor 31 and the coil 32 and the rectifying circuit 21.

The starting conductor 33 and the stopping conductor 35 are controlled to a closed condition/opened condition by the main controller 41, which will be described later. Specifically, when the power supply device 12 is started, the starting conductor 33 is opened to cause the inrush resistor 31 to suppress an inrush current. After a predetermined time from the start of the power supply device 12, the starting conductor 33 is closed to short circuit the inrush resistor 31. The stopping conductor 35 is opened during an operation while the stopping conductor 35 is closed at shutdown. The discharging resistor 34 consumes charge accumulated in the power supply device 12.

Step-Down Circuit 23

The step-down circuit 23 is a step-down device that lowers a direct voltage to be supplied to the inverter 24 according to the load of the induction line 14. The step-down circuit 23 lowers a direct voltage inputted from the rectifying circuit 21 through the start/stop circuit 22. Moreover, the step-down circuit 23 is controlled by the step-down controller 42. The step-down controller 42 receives a first voltage mode command and a second voltage mode command from the main controller 41, which will be described later, and then drives the step-down circuit 23 in response to the inputted mode command.

The first voltage mode command is a mode command for outputting a direct voltage inputted from the rectifying circuit 21 without lowering the direct voltage. The second voltage mode command is a mode command for saving energy by lowering the direct voltage to a predetermined voltage, allowing the supply of power typically consumed by the induction line 14.

In the first voltage mode command, a direct voltage inputted from the rectifying circuit 21 is directly supplied from the step-down circuit 23 to the inverter 24, whereas in the second voltage mode command, the lowered predetermined voltage is supplied from the step-down circuit 23 to the inverter 24.

Inverter 24

The inverter 24 converts the direct current outputted from the step-down circuit 23 into a high-frequency current at any oscillation frequency, and then supplies the current to the induction line 14.

The inverter 24 includes switching elements 38 arranged in a full bridge configuration. The switching elements 38 are driven by a pulse signal outputted from the frequency/current controller 43. The switching elements 38 convert the direct current inputted from the step-down circuit 23 into a high-frequency alternating current, and then supply the current as an output current to the induction line 14.

The frequency/current controller 43 receives a direct voltage and a direct current to be inputted to the inverter 24 and a rate of increase in output voltage by the frequency transformer 13. Furthermore, the frequency/current controller 43 receives the target frequency of the oscillation frequency of the inverter 24 from the main controller 41, which will be described later.

The frequency/current controller 43 drives the switching elements 38 so as to control the oscillation frequency of the inverter 24 to the target frequency inputted from the main controller 41; meanwhile, the frequency/current controller 43 drives the switching elements 38 so as to perform constant current control by determining a duty ratio (pulse width) having a preset constant current that is determined by calculating the current value of the induction line 14 based on the input voltage and current of the inverter 24 and the rate of increase in voltage. The determined duty ratio is outputted to the main controller 41.

Main Controller 41

The main controller 41 has the following functions:

(a) Start/Stop Function

In response to a power supply start command (a command for normally starting the power supply device 12) from the outside, an energy conservation reset command for resetting an energy-saving operation, or an intermittent operation/power supply start command for changing an off state to an on state during an intermittent operation, the stopping conductor 35 of the start/stop circuit 22 is opened, and then the starting conductor 33 is closed. At shutdown, the stopping conductor 35 is closed, and then the starting conductor 33 is opened.

A voltage inputted to the rectifying circuit 21 from the commercial power supply 11 is monitored. If the voltage rapidly drops in the event of an instantaneous power failure or the protective device detects an overload, the stopping conductor 35 of the start/stop circuit 22 is closed to shut down the power supply, and then the starting conductor 33 is opened. When the voltage is restored from the instantaneous power failure, the stopping conductor 35 of the start/stop circuit 22 is opened, and then the starting conductor 33 is closed.

(b) Step-Down Function

The second voltage mode command is normally outputted to the step-down controller 42. It is confirmed whether or not the duty ratio inputted from the frequency/current controller 43 is close to a maximum permissible duty ratio (e.g., 80%), and then the first voltage mode command is outputted to the step-down controller 42. When the inputted duty ratio becomes far from the maximum permissible duty ratio, the second voltage mode command is outputted to the step-down controller 42 again.

(c) Frequency Control Function

At the start of power supply (when the power supply start command, the energy conservation reset command, or the intermittent operation/power supply start command is inputted, or at the recovery from an instantaneous power failure), the target frequency of the oscillation frequency of the inverter 24 is swept from a low frequency shifted from the resonance frequency, e.g., 9.00 kHz (an example of a predetermined frequency) to 9.74 kHz, which is the resonance frequency, and then the target frequency is outputted.

In other words, at the start of power supply, the target frequency is set at the low frequency shifted from the resonance frequency, allowing the resonant circuit 50 to suppress total power obtainable by all the transport carriages 17 within rated power that can be supplied by the power supply device 12. After a predetermined time during which power supply to the induction line 14 can increase the output voltage of the power receiving unit 27 of the transport carriage 17 to a reference voltage, the target frequency is swept from the predetermined frequency of 9.00 kHz to the resonance frequency of 9.74 kHz.

Figure 2:
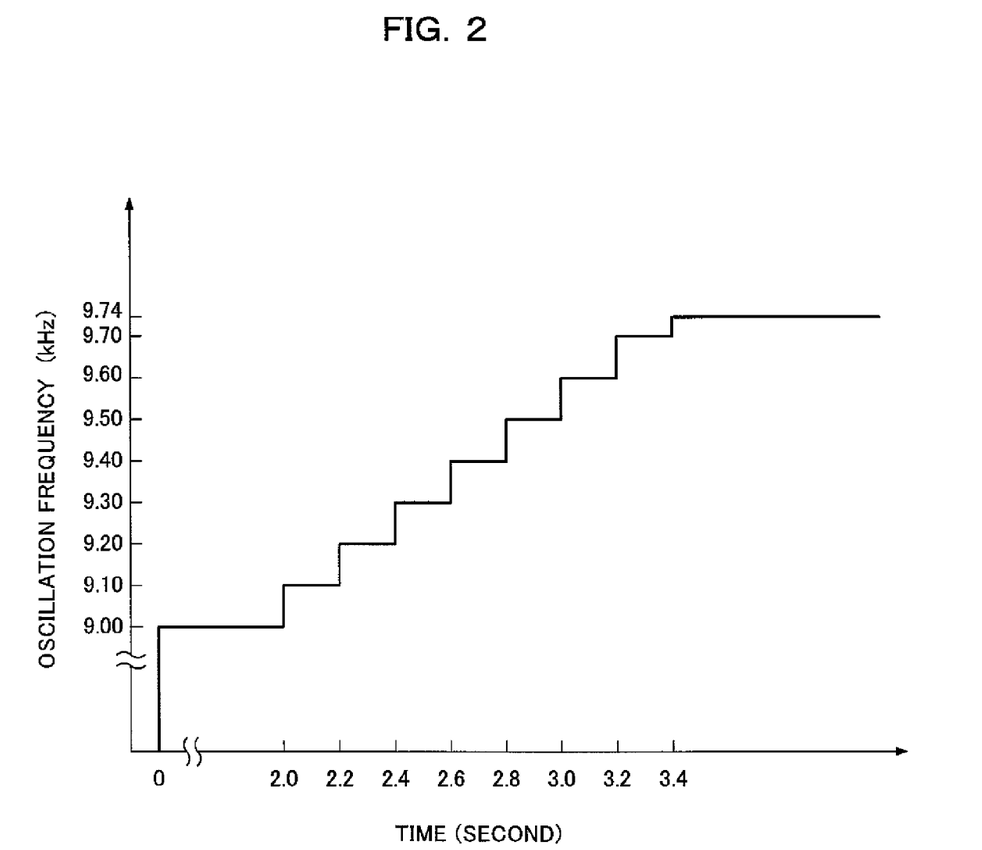
FIG. 2 shows a time variation of the oscillation frequency of a power supply device in the contactless power feed equipment.

Specifically, as shown in FIG. 2, the oscillation frequency of the inverter 24 is kept at 9.00 kHz for 2 seconds (an example of the predetermined time) from the start of power supply to the induction line 14, at 9.10 kHz for 0.2 seconds, at 9.20 kHz for 0.2 seconds, at 9.30 kHz for 0.2 seconds, at 9.40 kHz for 0.2 seconds, at 9.50 kHz for 0.2 seconds, at 9.60 kHz for 0.2 seconds, and then at 9.70 kHz for 0.2 seconds. After that, the target frequency is outputted to the frequency/current controller 43 so as to keep the output of 9.74 kHz (resonance frequency).

When power supply from the power supply device 12 to the induction line 14 is started during constant current control performed by the actions of the frequency/current controller 43 and the main controller 42, the inverter 24 sweeps the oscillation frequency from 9.00 kHz to 9.74 kHz.

The Action of the Power Supply Device 12

The action of the configuration of the power supply device 12 will be described below.

In an initial condition before power supply is started from the power supply device 12 to the induction line 14, it is assumed that the twenty transport carriages 17 are provided on the traveling rail having the induction line 14. Furthermore, it is assumed that the power supply device 12 is connected to the commercial power supply 11 of AC 200 V, the starting conductor 33 is opened, and the stopping conductor 35 is closed. The transport carriage 17 has rated power of 1800 W (power obtainable by the induction line 14 in a full-load condition (100% loaded condition) in a resonant condition of the resonant circuit 50 with the oscillation frequency of the power supply device 12). Moreover, the power supply device 12 has rated power (supplied power) of 30 kW. The rated power of the power supply device 12 is larger than power consumed by the load 58 of the traveling motor or the like that is necessary for a normal operation of the transport carriage 17. The rated power is set smaller than total power drawn by all the transport carriages 17 in the full-load condition (36 kW=1800 W×20) in the resonant condition with the oscillation frequency of the power supply device 12. Thus, the power supply device 12 does not require a large power capacity and is operable with a proper power capacity.

First, when the commercial power supply 11 is connected to the power supply device 12, the rectifying circuit 21 converts the alternating current of the commercial power supply 11 into a direct current and then outputs the direct current to the start/stop circuit 22. At this point, the starting conductor 33 is opened while the stopping conductor 35 is closed. Thus, the inrush current upon startup is suppressed (regulated) by the inrush resistor 31 and then is consumed by the discharging resistor 34. After a predetermined time, the starting conductor 43 is closed, the inrush resistor 31 is short-circuited, and then the stopping conductor 35 is opened, allowing a stable direct current to be outputted to the step-down circuit 23 after the inrush current is eliminated. At this point, a direct voltage rectified by the rectifying circuit 21 is DC 270 V.

Moreover, the target frequency of the oscillation frequency of the inverter 24 is set at 9.00 kHz. The target frequency is swept from 9.00 kHz to 9.74 kHz after a predetermined time (2 seconds).

Figure 3:
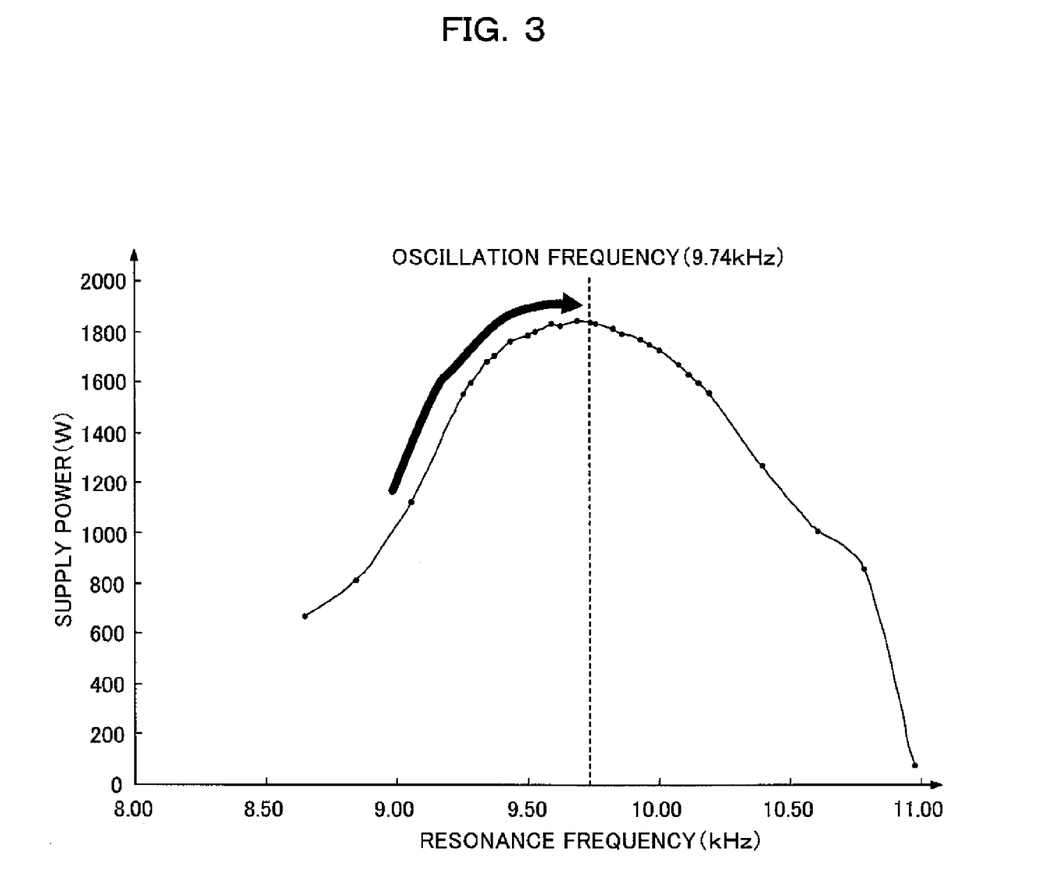
FIG. 3 shows the relationship between the oscillation frequency of the power supply device and power supplied to a mobile unit in the contactless power feed equipment.

At the oscillation frequency of 9.00 kHz, a current obtainable by the resonant circuit 50 of the transport carriage 17 is reduced. As shown in FIG. 3, rated power (1800 W) can be drawn at 9.74 kHz, whereas at 9.00 kHz shifted from the resonance frequency of 9.74 kHz, only 1200 W can be obtained (power is less efficiently supplied). When viewed from the power supply device 12, the total power supplied to all the transport carriages 17 is reduced. Hence, even if all the twenty transport carriages 17 are placed in the full-load condition, the total power is only 24 kW (=1200 W×20), which is lower than the rated power (30 kW) of the power supply device 12. This prevents an overloaded condition interrupting an output current.

When the oscillation frequency of the inverter 24 reaches 9.74 kHz, the transport carriage 17 can be placed in the full-loaded condition. After the predetermined time (2 seconds), the output voltage of the transport carriage 17 increases to the reference voltage, causing the normal transport carriage 17 to receive power equivalent to power consumed by the load 58. Hence, all the transport carriages 17 do not simultaneously obtain power in the full-load condition. Since an increase to the reference voltage is delayed in some of the transport carriages 17, only some of the transport carriages 17 obtain power in the full-load condition. This prevents the power supply device 12 from being overloaded, allowing stable power supply from the power supply device 12 to the induction line 14.

At shutdown, the stopping conductor 35 is closed, the starting conductor 33 is opened, and then the stopping conductor 35 is closed, allowing the discharging resistor 34 to consume charge accumulated in the power supply device 12.

If the oscillation frequency of the inverter 24 falls below 9.00 kHz, power obtainable by the transport carriage 17 further decreases, increasing a time period before the output voltage of the power receiving unit 27 increases to the reference voltage.

The Power Receiving Unit 27 of the Transport Carriage

As shown in FIG. 4, the power receiving unit 27 includes the resonant capacitor 52 and a rectifying circuit (full-wave rectifying circuit) 53 connected to the resonant capacitor 52.

The power receiving unit 27 further includes, as a constant voltage control circuit, a choke coil 54, a diode 55, the output capacitor (voltage capacitor) 56, switching device (e.g., an output adjusting transistor) 57, and a controller (control unit) 61.

One end of the choke coil 54 is connected to a positive-side output terminal (one output terminal) 53a of the rectifying circuit 53. The anode of the diode 55 is connected to another end of the choke coil 54. One end of the output capacitor 56 is connected to the cathode of the diode 55 while another end of the output capacitor 56 is connected to a negative-side output terminal (another output terminal) 53b of the rectifying circuit 53. One end of the switching device 57 is connected to the node of the other end of the choke coil 54 and the anode of the diode 55 while another end of the switching device 57 is connected to the negative-side output terminal 53b of the rectifying circuit 53. The controller 61 places the switching device 57 in a closed condition (the switching device is turned on) or an opened condition (the switching device is turned off).

The load 58 is connected between circuit output terminals 59a and 59b connected across the output capacitor 56.

The power receiving units 27 of the transport carriages 17 and the primary-side power supply device 12 are independently driven while receiving respective signals.

The controller 61 receives a full-wave input voltage (full-wave input voltage signal) $V_1$ of the choke coil 54 as a control signal. The full-wave input voltage is a voltage outputted to the positive-side output terminal 53a of the full-wave rectifying circuit 53 immediately after rectification. The controller 61 further receives a circuit output voltage (a voltage across the output capacitor 56, the voltage of the load 58) $V_2$ as a feedback signal. Moreover, the controller 61 outputs a driving pulse $P_2$ to the switching device 57. The controller 61 includes a gate pulse oscillator (an example of a pulse generating circuit) 62, a PWM module (an example of a pulse-width control circuit) 63, and a control power supply device 64.

Control Power Supply Device 64

The control power supply device 64 supplies control power (predetermined voltage $V_3$) to the gate pulse oscillator 62 and the PWM module 63 with the output voltage (a voltage across the output capacitor 56, the voltage of the load 58) $V_2$ serving as an input source. The output voltage (a voltage across the output capacitor 56, the voltage of the load 58) $V_2$ is 0 V upon startup. When the output voltage $V_2$ increases to a predetermined voltage (e.g., 15 V), the control power can be supplied at the predetermined voltage $V_3$.

Gate Pulse Oscillator 62

The gate pulse oscillator 62 is a pulse generating circuit that outputs, when receiving the control power from the control power supply device 64, a synchronizing pulse (trigger) at a frequency (2 f) twice a frequency f of the high-frequency current of the induction line 14 in synchronization with the full-wave input voltage $V_1$ of the choke coil 54, the full-wave input voltage $V_1$ being outputted to the positive-side output terminal 53a of the full-wave rectifying circuit 53. The gate pulse oscillator 62 forms a synchronizing pulse $P_1$ and outputs the pulse as a switching trigger to the PWM module 63 each time the input voltage $V_1$ of the choke coil 54 in FIG. 6 becomes 0. The input voltage $V_1$ is the output voltage of the full-wave rectifying circuit 53 and thus has a continuous waveform at the frequency 2 f, leading to the output of the synchronizing pulse $P_1$ at the frequency 2 f.

PWM Module 63

The PWM module 63 receives the output voltage V2 and the synchronizing pulse P1 outputted from the gate pulse oscillator 62. The PWM module 63 is a pulse width control circuit that outputs the driving pulse P2 to the switching device 57 when receiving the control power from the control power supply device 64, closes the switching device 57 when the driving pulse P2 is on, and opens the switching device 57 when the driving pulse P2 is off. The PWM module 63 is configured as illustrated in FIG. 5.

Figure 5:
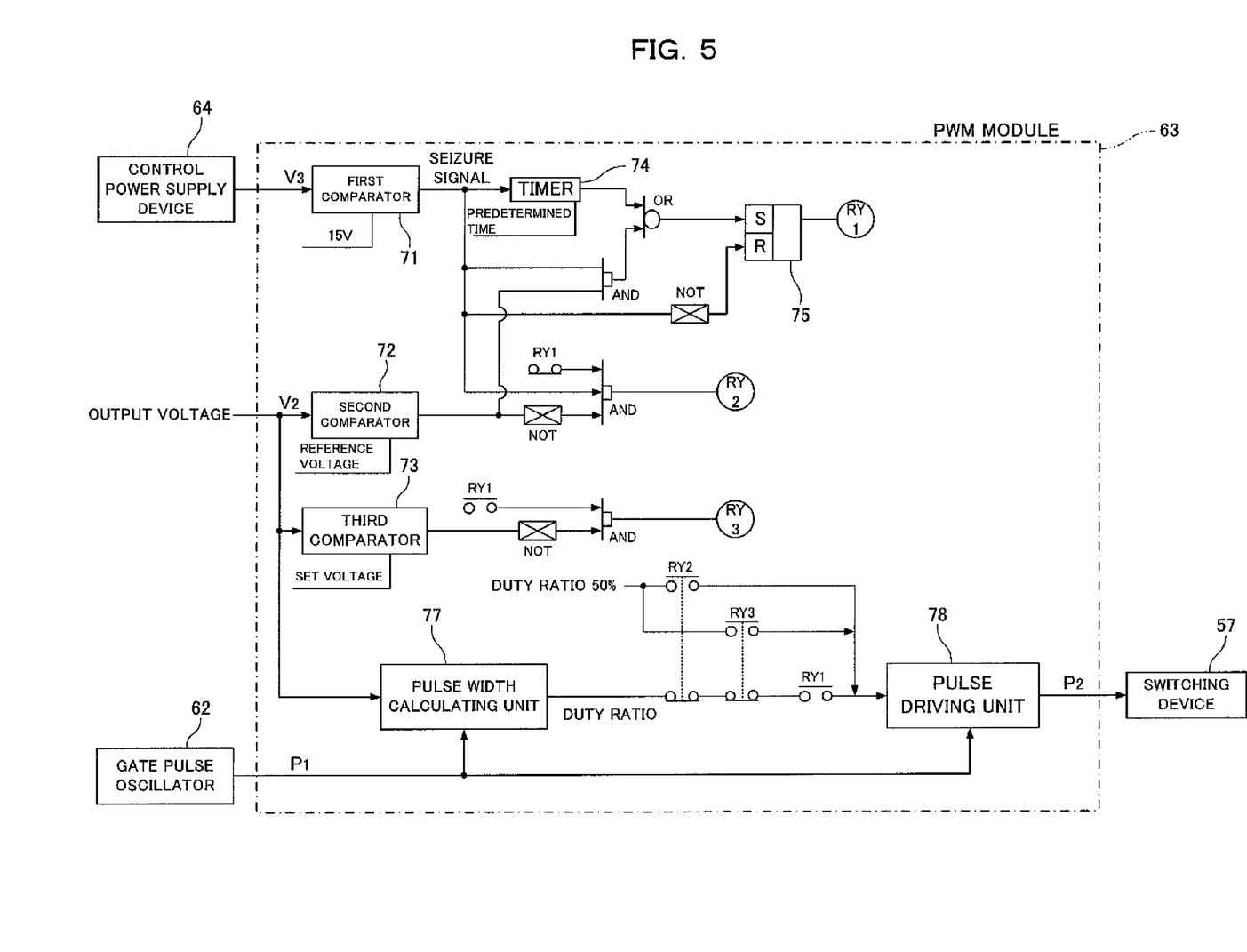
FIG. 5 is a control block diagram showing a PWM module in the secondary-side power receiving circuit in the contactless power feed equipment.

As shown in FIG. 5, the PWM module 63 includes a first comparator 71, a second comparator 72, a third comparator 73, a timer 74, an RS flip-flop 75, a pulse width calculating unit 77, and a pulse driving unit 78.

The first comparator 71 confirms whether control power has been supplied or not, that is, the voltage $V_3$ of control power is at least a predetermined voltage (e.g., 15 V). The second comparator 72 confirms whether the output voltage $V_2$ is at least a reference voltage (e.g., 310 V) or not. The third comparator 73 confirms whether the output voltage $V_2$ is at least a set voltage (e.g., 100 V) or not.

The timer 74 is a timer that starts counting in a preset time (predetermined time, e.g., 5 seconds) in response to the output signal of the first comparator 71, that is, a seizure signal outputted when control power is supplied (started).

The RS flip-flop 75 is set when a signal (progression signal) outputted in response to the counting of the timer 74 is turned on or when the seizure signal is turned on and the output signal of the second comparator 72 is turned on. The RS flip-flop 75 is reset when the seizure signal is turned off.

The PWM module 63 includes a relay RY1 operated (excited) when the RS flip-flop 75 is set. The PWM module 63 further includes a relay RY2 operated (excited) when the seizure signal is turned on, the output signal of the relay RY1 is turned off (a contact b is closed), and the output signal of the second comparator 72 is turned off. Moreover, the PWM module 63 includes a relay RY3 operated (excited) when the output signal (contact a) of the relay RY1 is turned on and the output signal of the third comparator 73 is turned off.

In the block configuration, the relay RY1 is operated when the supply of a high-frequency current I to the induction line 14 is started (the seizure signal is on) and the output voltage $V_2$ reaches at least the reference voltage (e.g., 310 V, when the output signal of the second comparator 72 is turned on). Alternatively, the relay RY1 is operated upon the lapse of the set time (the predetermined time, e.g., 5 seconds, when the output signal of the timer 74 is turned on). In other words, the relay RY1 is operated during a transition from the initial condition to a normal condition. The relay RY2 is operated when the supply of the high-frequency current I to the induction line 14 is started (the seizure signal is on) and the output voltage $V_2$ is lower than the reference voltage (e.g., 310 V when the output signal of the second comparator 72 is turned off), that is, in the initial condition. During a transition to the normal condition (when the relay RY1 is operated), the relay RY2 is not operated. The relay RY3 is operated if the output voltage $V_2$ abnormally falls below the set voltage (e.g., 100 V) during an operation of the relay RY1 (in the normal condition).

The pulse width calculating unit 77 receives the output voltage $V_2$ and the synchronizing pulse $P_1$. The pulse width calculating unit 77 performs output voltage feedback control with reference to the reference voltage serving as a target voltage.

Figure 6:
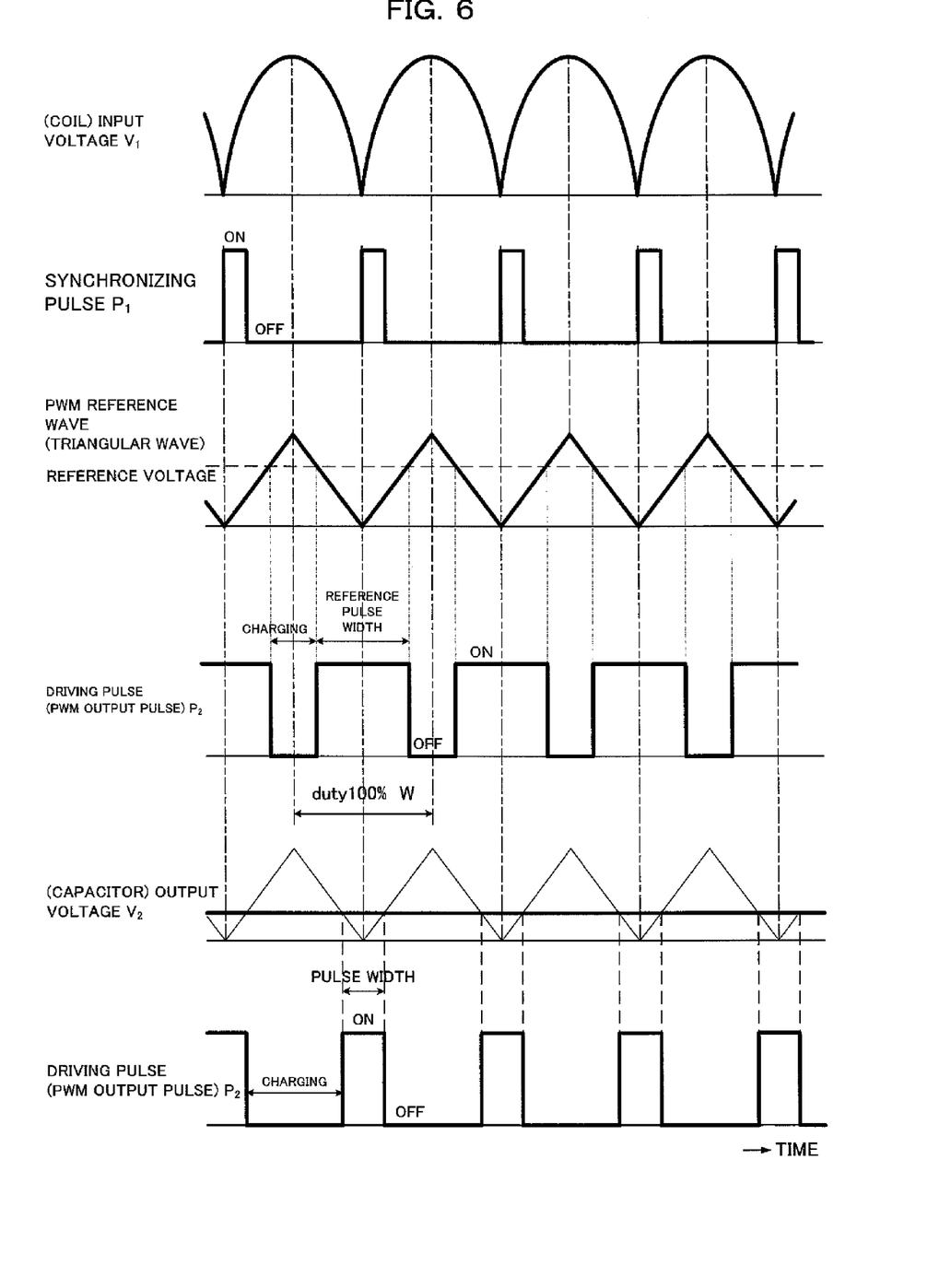
FIG. 6 is a characteristic chart showing parts of the secondary-side power receiving circuit in the contactless power feed equipment, and a driving pulse output when a capacitor output voltage is lower than a reference voltage.

Specifically, as shown in FIG. 6, the pulse width calculating unit 77 forms a PWM reference wave (triangular wave) in synchronization with the synchronizing pulse $P_1$ at the frequency 2 f from the gate pulse oscillator 62. In other words, the pulse width calculating unit 77 forms a triangular wave that peaks at the peak of the input voltage $V_1$ in synchronization with the input voltage $V_1$ of the choke coil 54. The pulse width calculating unit 77 presets the reference voltage (chain line) of the output voltage $V_2$, the reference voltage crossing the triangular wave. The driving pulse $P_2$ is turned on when the input voltage $V_1$ of the choke coil 54 decreases from the peak. The pulse width of the driving pulse $P_2$ is a time period when the triangular wave (voltage) is lower than the reference voltage. When the output voltage $V_2$ is equal to the reference voltage, the "reference pulse width" of the driving pulse $P_2$ is a time period during which the voltage of the triangular wave is lower than the reference voltage. When the load 58 is a rated load, the output voltage $V_2$ is kept at the reference voltage by outputting the driving pulse $P_2$ having the reference pulse width.

Figure 7:
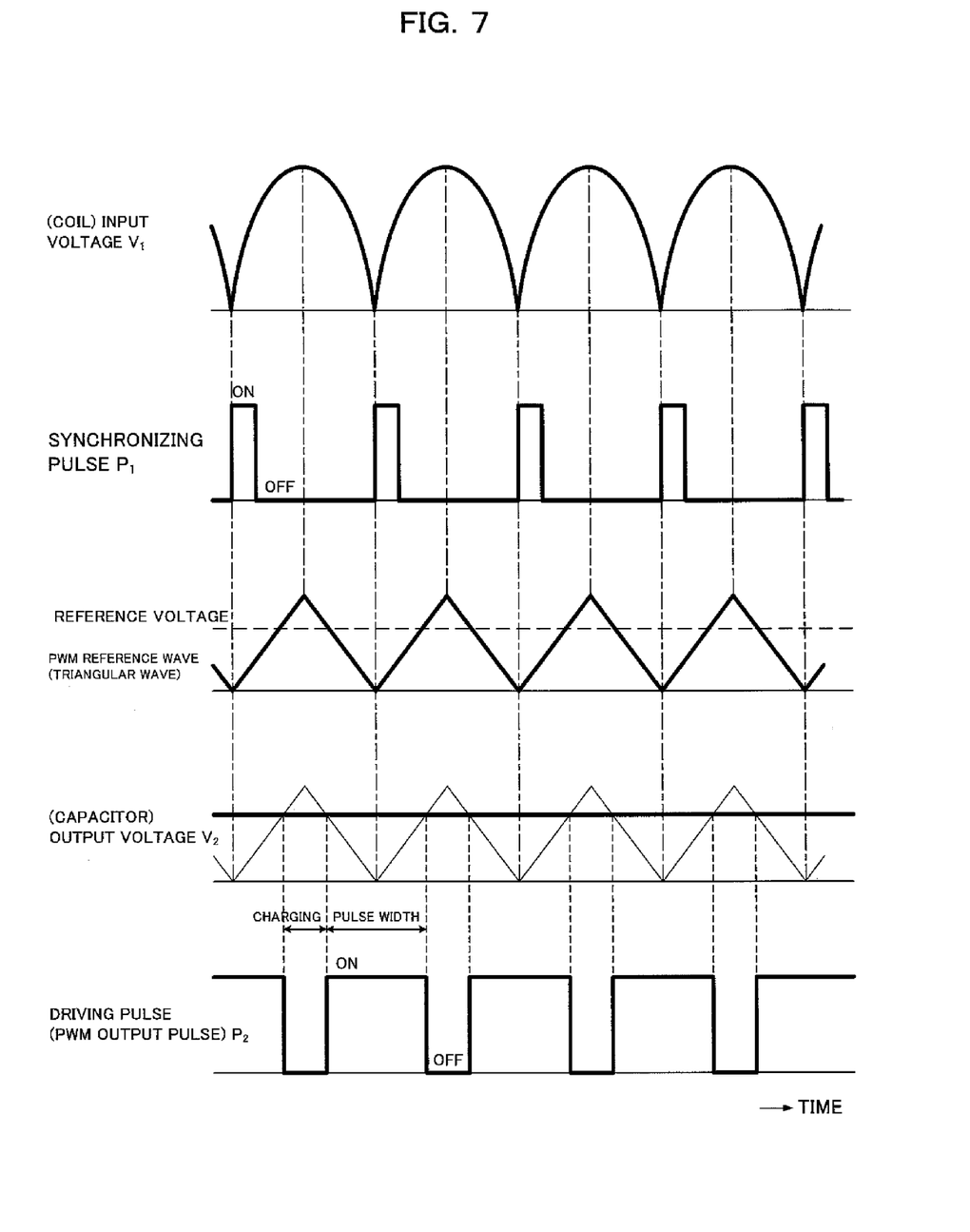
FIG. 7 is a characteristic chart showing the parts of the secondary-side power receiving circuit in the contactless power feed equipment, and a driving pulse output when the capacitor output voltage is higher than the reference voltage.

Moreover, the pulse width of the driving pulse $P_2$ is obtained by causing the inputted output voltage $V_2$ to cross the triangular wave. As shown in FIG. 6, when the output voltage $V_2$ is lower than the reference voltage, the pulse width of the driving pulse $P_2$ is shorter than the "reference pulse width". As shown in FIG. 7, when the output voltage $V_2$ is higher than the reference voltage, the pulse width of the driving pulse $P_2$ is made longer than the "reference pulse width". Furthermore, a duty ratio is determined and then is outputted to the pulse driving unit 78.

The pulse driving unit 78 outputs a pulse to the switching device 57. The pulse driving unit 78 receives the synchronizing pulse $P_1$. When the output signal (contact a) of the relay RY2 is turned on (initial condition) or the output signal (contact a) of the relay RY3 is turned on (when the output voltage $V_2$ abnormally decreases), a preset duty ratio (hereinafter, will be called a fixed duty ratio, e.g., 50% is inputted to the pulse driving unit 78. When the output signal (contact a) of the relay RY1 is turned on, a duty ratio outputted from the pulse width calculating unit 77 is inputted to the pulse driving unit 78. The pulse driving unit 78 forms the driving pulse $P_2$ based on the inputted duty ratio, and outputs the intermediate point of the driving pulse $P_2$ as the zero crossing position of the full-wave input voltage $V_1$ to the switching device 57, enabling pulse width control.

The fixed duty ratio is determined as follows: the rated power of the power supply device 12 is first divided by the number of transport carriages (an example of the apparatus or the device) 17 to be provided with power, determining power receivable by each of the transport carriages at the beginning of power supply to the induction line 14.

Subsequently, when the driving pulse P2 has a pulse width of 0, in other words, when the driving pulse P2 is turned off, the switching device 57 is continuously opened, and the output capacitor 56 is continuously charged, the secondary side is in a full-load condition (100% loaded condition) with respect to the primary side (the power supply device 12). When the pulse width is m (a driving pulse that can be outputted has a (maximum) pulse width of W), the outputted driving pulse P2 places the switching device 17 in a closed condition so as not to charge the output capacitor 56. Thus, the secondary side is in a loaded condition of (1−m/W) with respect to the primary side (as the pulse width m decreases, the secondary side comes close to the full-load condition).

In the loaded condition of (1−m/W), the pulse width m is set so as to suppress power to the determined "power receivable by each of the transport carriages".

The pulse width m of the driving pulse $P_2$ that can suppress power within the receivable power is divided by the pulse width W of the driving pulse that can be outputted, thereby determining the fixed duty ratio (=m/W). In the present embodiment, the fixed duty ratio is 50%.

At this point, the power supply device 12 for supplying a high-frequency current to the induction line 14 starts in a half-load condition (50% load condition) even if all the transport carriages 17 are simultaneously loaded when power supply is started. Thus, the power supply device 12 is not overloaded, avoiding an interruption of power supply.

The set time of the timer 74 includes a margin for a time period during which the output capacitor 17 is charged in a loaded condition with the fixed duty ratio so as to increase the output voltage $V_2$ to the reference voltage (e.g., 310 V).

In the configuration of the PWM module 63, the driving pulse $P_2$ is turned on when the input voltage $V_1$ of the choke coil 54 decreases from the peak in synchronization with the synchronizing pulse $P_1$ at the frequency 2 f. High-speed switching is performed at the switching frequency 2 f while the intermediate point of the pulse width of the driving pulse $P_2$ is located as the zero crossing position of the full-wave input voltage $V_1$.

When the output signal (contact a) of the relay RY2 is turned on, that is, when the output voltage $V_2$ is lower than the reference voltage upon startup, high-speed switching is performed with the fixed duty ratio of 50%.

When the output signal (contact a) of the relay RY1 is turned on, that is, the output voltage V2 is at least the reference voltage upon startup, or when the timer 74 counts up, high-speed switching is performed with the duty ratio outputted from the pulse width calculating unit 77, that is, output voltage feedback control is performed with the reference voltage serving as a target voltage. At this point, the stopping of the traveling motor reduces the load 58 and increases the output voltage V2 over the preset reference voltage. Thus, the pulse width m of the driving pulse P2 outputted to the switching device 57 is increased (the closed condition of the switching device 57 is extended) to reduce the output voltage V2. When the output voltage V2 returns to the reference voltage, the pulse width m of the driving pulse P2 outputted to the switching device 57 is reduced (the opened condition of the switching device 57 is extended), keeping the output voltage V2 at the reference voltage.

In the case where the output signal (contact a) of the relay RY1 is turned on (a transition to output voltage feedback control) and then the output voltage $V_2$ falls below the set voltage (the relay RY3 is turned on), high-speed switching is performed with the fixed duty ratio of 50%.

The Action of the Power Receiving Unit 27

The action of the configuration of the power receiving unit 27 will be described below.

When the high-frequency current I is supplied to the induction line 14 on the primary side, magnetic fluxes generated on the induction line 14 induce an induced electromotive force on the pickup coil 51, and then a current generated on the pickup coil 51 by the induced electromotive force is rectified by the full-wave rectifying circuit 53.

Immediately After Startup

Before startup, the output capacitor 56 is empty while the output voltage $V_2$ is 0 V. Immediately after the supply of the high-frequency current I to the induction line 14 is started, control power cannot be supplied from the control power supply device 64. At this point, the PWM module 63 cannot output the driving pulse $P_2$. Thus, the switching device 57 is opened and the output capacitor 56 is continuously charged by the current outputted from the full-wave rectifying circuit 53.

Upon Startup

The output capacitor 56 is charged and the output voltage $V_2$ increases so as to allow the supply of control power from the control power supply device 64. In this state, the synchronizing pulse $P_1$ is inputted from the gate pulse oscillator 62 to the PWM module 63, the seizure signal is turned on by confirming the control power, and then the timer 74 is driven. At this point, the output voltage $V_2$ is lower than the reference voltage, limiting the fixed duty ratio to 50%. In other words, high-speed switching is performed with a half load.

In other words, the switching device 57 undergoes high-speed switching at the switching frequency 2 f (e.g., f=10 kHz, limited to 60 kHz or lower). When the switching device 57 is opened (the driving pulse P2 is turned off), the current outputted from the full-wave rectifying circuit 53 charges the output capacitor 56 with the excitation energy of the choke coil 54 while being supplied to the load 58. When the switching device 57 is in a closed condition (the driving pulse P2 is turned on), the current outputted from the full-wave rectifying circuit 53 excites the choke coil 54 to charge energy; meanwhile, a discharge current is supplied from the output capacitor 56 to the load 58.

Upon startup, a current passing through the induction line 14 has a frequency of 9.00 kHz, which is shifted from the resonance frequency of the resonant circuit 50. Thus, only 1200 W can be obtained in the full-load condition, indicating that only 600 W can be obtained in the half load condition.

After a Reference Time From Startup/In Normal Condition

When the timer 74 counts up, output voltage feedback control is performed forcibly or in response to the output voltage $V_2$ not lower than the reference voltage serving as a target voltage. High-speed switching is performed with the duty ratio outputted from the pulse width calculating unit 77.

Specifically, the switching device 57 undergoes high-speed switching at the switching frequency 2 f, and the pulse width of the driving pulse P2 is determined by the output voltage V2 when the pulse is turned on. The pulse width is reduced when the output voltage V2 is lower than the preset reference voltage, whereas the pulse width is increased when the output voltage V2 is higher than the reference voltage. In other words, the load 58 decreases while a voltage across the output capacitor 56, that is, the output voltage V2 increases. If the output voltage V2 exceeds the reference voltage, the switching device 57 is placed in a closed condition for an extended period, reducing the output voltage V2 to the constant reference voltage. Furthermore, the load 58 increases, the voltage across the output capacitor 56, that is, the output voltage V2 decreases, and the output voltage V2 falls below the reference voltage. Thus, the switching device 57 is placed in an opened condition for an extended period, increasing the output voltage V2 to the constant reference voltage.

The switching frequency is correctly set at 2 f, and the driving pulse $P_2$ is turned on when the input voltage $V_1$ of the choke coil 54 decreases from the peak. Thus, when the driving pulse $P_2$ is turned on, that is, the choke coil 54 is excited, a current supplied to the choke coil 54 by the resonant circuit 50 is shifted in phase by 90° and thus is substantially zero. After that, the input voltage $V_1$ decreases in the zero-crossing range of the input voltage $V_1$, suppressing an increase in current (coil current) $I_1$ passing through the choke coil 54 into a smooth current (reduced pulsation). The ripple of the coil current $I_1$ is reduced so as to have a smaller difference between the input voltage and the output voltage of the choke coil 54, considerably suppressing the ripple of the coil current $I_1$.

High-speed switching at the switching frequency 2 f quickly responds to fluctuations of the load 58, reducing the influence of fluctuations of the load 58 on the induction line 14 through the resonant circuit 50, for example, the influence of an overcurrent of the induction line 14 when feedback impedance rapidly comes close to zero.

Moreover, high-speed switching at the switching frequency 2 f quickly responds to the output voltage $V_2$ during a transition from a nonresonant condition to a resonant condition, suppressing a rapid increase in resonant voltage.

The output voltage is increased by high-speed switching and a step-up topology. Even if the resonance frequency of the pickup coil 51 is deviated from the frequency f of the high-frequency current I supplied to the induction line 14, the supplied power can be kept. In other words, the frequency response of power supply is improved from the related art so as to obtain power over a wide range of frequency deviations, allowing stable power supply even if the frequency of the high-frequency current is deviated.

Abnormal Condition

During output voltage feedback control, if the output voltage $V_2$ falls below the set voltage, high-speed switching is performed while the duty ratio is limited to the fixed duty ratio of 50%, that is, in a half-load condition.

Specifically, if the output voltage $V_2$ continuously falls below the reference voltage, the duty ratio is 0%, that is, the switching device 57 is opened into a full-load condition so as to fully charge the output capacitor 56 back to the reference voltage. If the output voltage $V_2$ does not increase but decreases to the set voltage, it is decided that a current has been abnormally supplied to the induction line 14. Thus, high-speed switching is performed in the half-load condition so as not to apply a load to the induction line 14.

According to the explanation of the action of the power supply device 12 and the action of the power receiving unit 27, the power supply device 12 and the power receiving units 27 of the transport carriages 17 are independently driven while receiving respective signals. Upon startup, however, the power supply device 12 regulates the frequency of a high-frequency current passing through the induction line 14, the frequency being obtained by each of the transport carriages 17 as a frequency shifted from the resonance frequency; meanwhile, the transport carriages 17 are placed in a half-load condition, regulating the frequency obtained by each of the transport carriages 17. This prevents the power supply device 12 from being overloaded and prevents a high-frequency current passing through the induction line 14 from being interrupted so as to block power supply.

In the event of an instantaneous power failure, an interrupted high-frequency current does not rapidly reduce the output voltage of the transport carriage 17 to the set voltage. Moreover, upon recovery of the high-frequency current, the transport carriages 17 are placed in the half-load condition and the frequency obtained by each of the transport carriages 17 is not limited. Thus, power is obtained by the transport carriages 17 in the full-load condition. This can prevent, upon "an instantaneous power failure", the power supply device 12 from becoming overloaded only by shifting, from the resonance frequency, the frequency of the high-frequency current passing through the induction line 14, thereby avoiding an interruption of the high-frequency current passing through the induction line 14 so as to keep power supply.

As has been discussed, according to the present embodiment, when power supply to the primary-side induction line 14 is started, the driving pulse $P_2$ is outputted with the fixed duty ratio of 50%, charging the output capacitor 56 in the half-load condition with respect to the primary side. Thus, all the transport carriages 17 do not simultaneously receive maximum power, that is, power in the full-load condition when power supply is started, and the power supply device 12 for supplying a high-frequency current to the primary-side induction line 14 does not become overloaded, avoiding a power shutdown. Thus, power can be continuously supplied to the large number of transport carriages 17. After the output capacitor 56 is charged to set the output voltage $V_2$ at the reference voltage, power may be supplied from the primary-side induction line 14 according to consumed power under output voltage feedback control. Even the transport carriages 17 under output voltage feedback control do not overload the power supply device 12, avoiding a power shutdown.

According to the present embodiment, the output capacitor 56 is charged in the half-load condition with respect to the primary side. After a predetermined time (when the output signal of the timer 74 is turned on), output voltage feedback control is performed. If the charging of the output capacitor 56 is too late to increase the transport carriage 17 to the reference voltage within the predetermined time, the pulse width m is minimized in the full-load condition, more quickly increasing the output voltage $V_2$. Another one of the transport carriages 17 increases to the reference voltage within the predetermined time and receives only power equivalent to consumed power. Thus, even if one of the transport carriages 17 is placed in the full-load condition, the power supply device 12 is unlikely to be overloaded so as to stop power supply.

According to the present embodiment, if the output voltage of the output capacitor 56 falls to or below the set voltage, it is decided that power cannot be supplied from the power supply device 12. The driving pulse $P_2$ is outputted with the fixed duty ratio in the half-load condition with respect to the primary side such that the width m of the driving pulse is a half of the pulse width W of the driving pulse that can be outputted. This can improve the loaded condition of the power supply device 12.

In the present embodiment, the oscillation frequency of the inverter 24 is controlled so as to gradually change from 9.00 kHz, which is the predetermined frequency lower than the resonance frequency of 9.74 kHz, to the resonance frequency of 9.74 kHz. As shown in FIG. 3, also in the case where the oscillation frequency of the inverter 24 is controlled so as to gradually change to a frequency higher than the resonance frequency of 9.74 kHz, power supplied to the transport carriages 17 can be reduced. The oscillation frequency of the inverter 24 may be controlled so as to gradually change from a frequency (e.g., 10.5 kHz) higher than the resonance frequency (9.74 kHz) to the resonance frequency (9.74 kHz).

According to the present embodiment, the oscillation frequency of the inverter 24 is gradually changed to the resonance frequency every 0.1 kHz. The interval is not limited to 0.1 kHz and thus may be set larger or smaller than 0.1 kHz to continuously change the frequency.

According to the present embodiment, the PWM module 63 of the controller 61 forms the PWM reference wave (triangular wave) in synchronization with the synchronizing pulse $P_1$ at the frequency 2 f from the gate pulse oscillator 62. Three PWM reference waves (triangular waves) may be formed by two waveforms of the input voltage $V_1$ in synchronization with every other period of the synchronizing pulse $P_1$ so as to turn on the driving pulse $P_2$ on the rising edge of each triangular wave. At this point, the switching frequency of the driving pulse $P_2$ is three times as high as the high-frequency current frequency f (3 f), enabling faster switching. Thus, the high-speed switching more quickly responds to fluctuations of the load 58, reducing the influence of fluctuations of the load 58 on the induction line 14 through the resonant circuit 50, for example, the influence of an overcurrent of the induction line 14 when a feedback impedance rapidly comes close to zero. Moreover, the high-speed switching quickly responds to the output voltage $V_2$ during a transition from a nonresonant condition to a resonant condition, suppressing a rapid increase in resonant voltage.

The present embodiment described the transport carriage 17 as an example of the apparatus or the device. The apparatus or the device includes a motor vehicle having no transport function, and a stationary apparatus or device.

Having described the invention, the following is claimed:

1. A secondary-side power receiving circuit for contactless power feed equipment, the secondary-side power receiving circuit being provided in each of devices or apparatuses so as to receive power in a contactless manner from a primary-side induction line that receives a high-frequency current from a power supply device, the secondary-side power receiving circuit comprising:
a pickup coil opposed to the primary-side induction line, the pickup coil receiving an induced electromotive force from the primary-side induction line;
a resonant capacitor connected in parallel with the pickup coil, the resonant capacitor forming a resonant circuit that resonates at a frequency of the high-frequency current with the pickup coil;
a full-wave rectifying circuit connected in parallel with the resonant capacitor of the resonant circuit;
a switch and an output capacitor connected in parallel between output terminals of the full-wave rectifying circuit, the output capacitor feeding power to a load having varying power consumption; and
a controller that switches a closed condition and an opened condition of the switch,
the controller comprising:
a pulse generating circuit that outputs a synchronizing pulse having a frequency multiple times higher than the frequency of the high-frequency current in synchronization with a full-wave voltage signal outputted from one of the output terminals of the full-wave rectifying circuit; and
a pulse width control circuit that outputs a driving pulse to the switch and performs output voltage feedback control such that an output voltage of the output capacitor is set at a preset reference voltage by closing the switch at turn-on of the driving pulse or opening the switch at turn-off of the driving pulse,
wherein the pulse width control circuit determines power receivable by each of the devices or apparatuses at start of power supply to the primary-side induction line by dividing output rated power of the power supply device by a number of devices or apparatuses, the pulse width control circuit determines a pulse width of the driving pulse capable of suppressing power within the receivable power by a pulse width of a driving pulse that can be outputted, the pulse width control circuit performs switching control at the start of power supply to the primary-side induction line such that the driving pulse capable of suppressing the power is outputted to the switch in synchronization with the synchronizing pulse inputted from the pulse generating circuit, and then the pulse width control circuit performs the output voltage feedback control when the output voltage of the output capacitor reaches the preset reference voltage.

2. The secondary-side power receiving circuit for the contactless power feed equipment according to claim 1, wherein the pulse width control circuit performs the switching control and then forcibly performs the output voltage feedback control after a predetermined time during which the output voltage of the output capacitor rises to the reference voltage.

3. The secondary-side power receiving circuit for the contactless power feed equipment according to claim 1, wherein during the output voltage feedback control, the pulse width control circuit performs the switching control again when the output voltage of the output capacitor falls to or below a set voltage lower than the reference voltage.

4. The secondary-side power receiving circuit for the contactless power feed equipment according to claim 2, wherein during the output voltage feedback control, the pulse width control circuit performs the switching control again when the output voltage of the output capacitor falls to or below a set voltage lower than the reference voltage.

* * * * *